United States Patent
Kim et al.

(10) Patent No.: US 11,368,274 B2
(45) Date of Patent: **\*Jun. 21, 2022**

(54) METHOD AND APPARATUS FOR CHANNEL QUALITY ESTIMATION IN CONSIDERATION OF INTERFERENCE CONTROL AND COORDINATED COMMUNICATION IN CELLULAR SYSTEM

(71) Applicant: Samsung Electronics Co., Ltd., Suwon-si (KR)

(72) Inventors: Yohan Kim, Seoul (KR); Eunyong Kim, Yongin-si (KR); Joseph Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

This patent is subject to a terminal disclaimer.

(21) Appl. No.: 16/947,252

(22) Filed: Jul. 24, 2020

(65) Prior Publication Data

US 2020/0358580 A1 Nov. 12, 2020

Related U.S. Application Data

(63) Continuation of application No. 15/508,907, filed as application No. PCT/KR2015/009325 on Sep. 3, 2015, now Pat. No. 10,764,016.

(30) Foreign Application Priority Data

Sep. 3, 2014 (KR) .................. 10-2014-0116850

(51) Int. Cl.
H04W 24/10 (2009.01)
H04L 5/00 (2006.01)
(Continued)

(52) U.S. Cl.
CPC ......... *H04L 5/0057* (2013.01); *H04B 17/318* (2015.01); *H04B 17/345* (2015.01); *H04W 24/10* (2013.01)

(58) Field of Classification Search
CPC ..... H04L 5/0057; H04W 24/10; H04B 17/345
See application file for complete search history.

(56) References Cited

U.S. PATENT DOCUMENTS 9,877,315 B2   1/2018 You et al.
2012/0236776 A1   9/2012 Zhang et al.
(Continued)

FOREIGN PATENT DOCUMENTS

CN   103718623 A   4/2014
CN   103765941 A   4/2014
(Continued)

OTHER PUBLICATIONS

Notification of a Decision to Grant a Patent dated May 14, 2021, in connection with a counterpart Korean application No. 10-2014-0116850, 4 pages.
(Continued)

*Primary Examiner* — Lakeram Jangbahadur

(57) ABSTRACT

Disclosed are a method and an apparatus for channel quality estimation in consideration of interference control and coordinated communication in a cellular system. A base station receives an SRS transmitted by a terminal to thus measure received power, and then configures, for the terminal, a CSI process which may measure SINRs for base stations having higher SRS received power. If the terminal feeds back, to the base station, channel quality information for the configured CSI process, the base station determines an SINR and a MCS to be applied to data transmission in consideration of a received CQI and a CoMP transmission scheme, and applies the determined SINR and MCS to thus transmit data.

16 Claims, 11 Drawing Sheets

(51) Int. Cl.
*H04B 17/318* (2015.01)
*H04B 17/345* (2015.01)

(56) References Cited

U.S. PATENT DOCUMENTS

| | | | | |
|---|---|---|---|---|
| 2013/0083729 A1* | 4/2013 | Xu | ............ | H04W 52/325 |
| | | | | 370/328 |
| 2013/0308473 A1 | 11/2013 | Sun et al. | | |
| 2013/0310037 A1* | 11/2013 | Ji | ............ | H04W 36/0085 |
| | | | | 455/436 |
| 2013/0322373 A1 | 12/2013 | Jeon et al. | | |
| 2014/0036809 A1 | 2/2014 | Xu et al. | | |
| 2014/0050182 A1* | 2/2014 | Iwai | ............ | H04W 52/325 |
| | | | | 370/329 |
| 2014/0169322 A1 | 6/2014 | Ouchi et al. | | |
| 2014/0219232 A1 | 8/2014 | Takeda et al. | | |
| 2016/0150509 A1* | 5/2016 | You | ............ | H04L 5/0053 |
| | | | | 370/329 |

FOREIGN PATENT DOCUMENTS

| | | | |
|---|---|---|---|
| KR | 20130134873 A | 12/2013 | |
| KR | 20130141382 A | 12/2013 | |
| WO | 2014038755 A1 | 3/2014 | |

OTHER PUBLICATIONS

Alcatel-Lucent, et al. "Proposed signalling information supporting eCoMP with NIB", 3GPP TSG-RAN WG1 Meeting #76, R1-140168, Prague, Czech Republic, Feb. 10-14, 2014, 6 pages.
The First Office Action in connection with Chinese Application No. CN201580054299.1 dated Sep. 3, 2019, 17 pages.
3GPP (3GPP TSG WG1 Meeting 76-R1-140379), Feb. 2014.
Supplementary European Search Report in connection with European Patent Application No. 15 83 8431 dated May 16, 2018.
Samsung, "Use of SRS received power for Inter-eNB CoMP", 3GPP TSG RAN WG1 Meeting #76, Feb. 10-14, 2014, 5 pages.
Intel Corporation, "CSI Process and Feedback Configuration for DL CoMP", 3GPP TSG-RAN WG2 #79bis Sep. 8-12, 2012, 5 pages.
Shaohui Sun et al., "Interference Management Through CoMP in 3GPP LTE-Advanced Networks", IEEE Wireless Communications, Feb. 1, 2013, p. 59-66.
3GPP TR 36 819 V11 2.0, "3rd Generation Partnership Project; Technical Specification Group Radio Access Network Coordinated Multi-Point Operation for LTE Physical Layer Aspects (Release 11)" Sep. 2013, 70 pages.
International Search Report dated Dec. 16, 2015 in connection with International Application No. PCT/KR2015/009325, 5 pages.
Written Opinion of the International Searching Authority dated Dec. 16, 2015 in connection with International Application No. PCT/KR2015/009325, 4 pages.

* cited by examiner

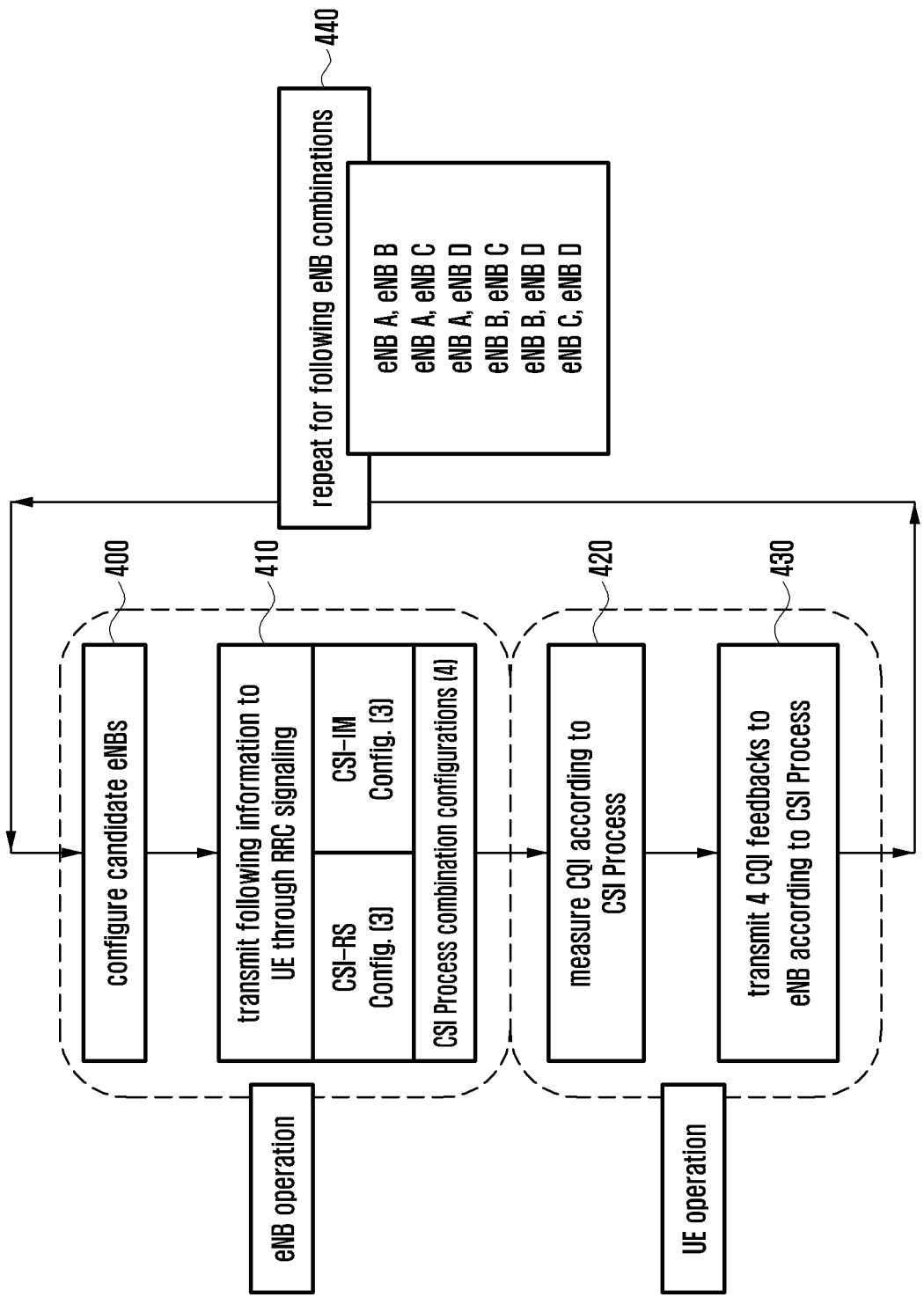

METHOD AND APPARATUS FOR CHANNEL QUALITY ESTIMATION IN CONSIDERATION OF INTERFERENCE CONTROL AND COORDINATED COMMUNICATION IN CELLULAR SYSTEM

CROSS-REFERENCE TO RELATED APPLICATIONS

This application is a continuation of application Ser. No. 15/508,907 which is the 371 National Stage of International Application No. PCT/KR2015/009325, filed Sep. 3, 2015, which claims priority to Korean Application No. 10-2014-0116850, filed Sep. 3, 2014, the disclosures of which are incorporated herein by reference into the present disclosure as if fully set forth herein.

BACKGROUND

1. Field

The present invention relates to a method and apparatus for determining a channel quality estimation scheme in a broadband wireless communication system.

2. Description of Related Art

The mobile communication system has been developed for the user to communicate on the move. With the rapid advance of technologies, the mobile communication system has evolved to a level capable of providing a high speed data communication service as well as a voice telephony service.

Recently, as one of the next generation mobile communication systems, LTE-Advanced (LTE-A) is being standardized by the 3rd Generation Partnership Project (3GPP). The LTE-A is a continuously evolving technology for realizing high-speed packet-based communication at a data rate of 3 to 10 times higher than that of current systems.

LTE-A adopts Coordinated Multi-Point (CoMP) transmission/reception as a communication scheme in which neighboring base stations transmit/receive data based on the channel information provided by a terminal in a way of cooperation and interference control, thereby reducing inter-base station interference and improving the data rate of the terminal in an optimal communication environment.

Although the coverage of base stations participating in a CoMP transmission is restricted to the cells of one evolved Node B (eNB) in an LTE-A Release 11 standard system, the present invention is applicable to systems supporting the inter-eNB CoMP transmission as well as the systems following the CoMP transmission scenarios defined in the LTE-A release 11 standards. In the following description, the term "base station" is used in the meaning of coverage including the cells belonging to one or more eNBs or base stations specified for other communication systems. For this reason, drawings are depicted as normal diagrams without boundaries between inside and outside of eNBs.

In the following description, the term "LTE system" is used with the meaning to include legacy LTE and LTE-A systems.

SUMMARY

In order to support the CoMP operation, it is necessary to define a CSI process for a terminal to perform feedback of channel status information for use in the CoMP operation. LTE-A specifies support for up to 4 CSI processes, which are restrictive to secure rich channel status information; thus, there is a need of a method for acquiring channel status information related to the neighboring base stations efficiently using the limited number of CSI processes.

In accordance with an aspect of the present invention, a method for transmitting channel quality information (CQI) from a terminal to a base station in a wireless communication system includes transmitting, at the terminal, a sounding reference signal and receiving channel status information (CSI) configuration information configured based on a result of comparing reception powers of the sounding reference signal at a serving base station and neighboring base stations.

In accordance with another aspect of the present invention, a method for a base station to receive Channel Quality Information (CQI) from a terminal in a wireless communication system includes receiving a sounding reference signal from the terminal, receiving sounding reference signal-reception power information from neighboring base stations, generating channel status information (CSI) configuration information by comparing reception powers of the sounding reference signal at a serving base station and neighboring base stations, and transmitting CSI configuration information to the terminal.

In accordance with another aspect of the present invention, a terminal for transmitting channel quality information (CQI) to base stations in a wireless communication system includes a transceiver for transmitting and receiving signals and a control unit which controls the transceiver to transmit a sounding reference signal and receive channel status information (CSI) configuration information configured based on a result of comparing reception powers of the sounding reference signal at a serving base station and neighboring base stations.

In accordance with still another aspect of the present invention, a base station for receiving channel quality information (CQI) from a terminal in a wireless communication system includes a transceiver for transmitting and receiving signals and a control unit which controls the transceiver to receive a sounding reference signal from the terminal and sounding reference signal-reception power information from neighboring base stations, generates channel status information (CSI) configuration information by comparing reception powers of the sounding reference signal at a serving base station and neighboring base stations, and controls the transceiver to transmit CSI configuration information to the terminal.

The channel quality estimation method of the present invention for use in a broadband communication cellular system is advantageous in terms of facilitating data transmission by estimating channel quality with a limited number of CSI processes.

BRIEF DESCRIPTION OF THE DRAWINGS

FIG. 4 is a flowchart illustrating a procedure for a UE to measure multiple SINRs for feedback;

DETAILED DESCRIPTION

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the description is directed to the OFDM-based radio communication system, particularly the 3GPP LTE, it will be understood by those skilled in the art that the present invention can be applied even to other communication systems having a similar technical background and channel format, with a slight modification, without departing from the spirit and scope of the present invention.

Figure 1:
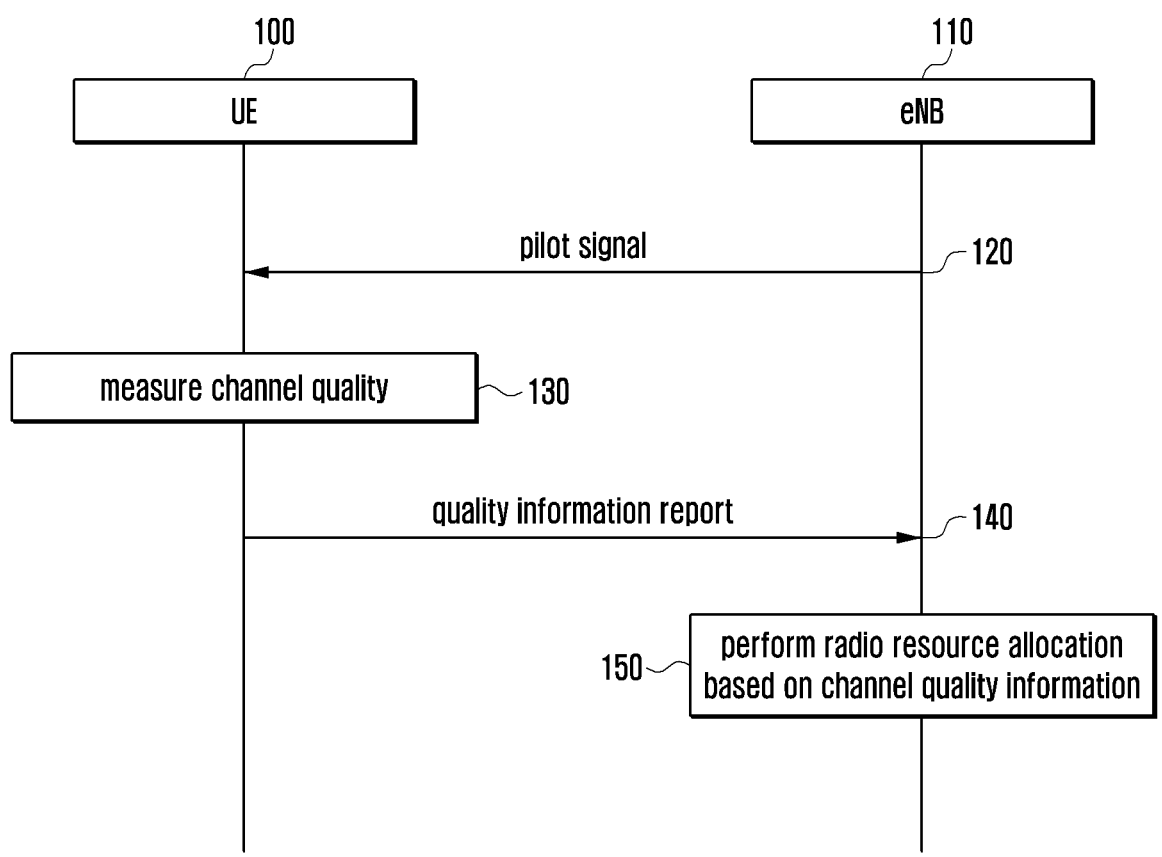
FIG. 1 is a signal flow diagram illustrating a procedure for measuring and applying channel quality information in a general communication system.

FIG. 1 is a signal flow diagram illustrating a procedure for measuring and applying channel quality information in a general communication system.

In reference to FIG. 1, the eNB 110 acts as s transmitter to transmit downlink signals to the UE 100, the downlink signals including a pilot signal for use in channel quality measurement at step 120. The UE measures channel quality with the pilot signal at step 130 and transmits measured channel quality information to the eNB at step 140. A scheduler of the eNB performs scheduling at step 150 to allocate radio resources to the UE based on the channel quality information.

The eNB may allocate the radio resources in a way of acquiring efficiently much information on the channel quality between the eNB and the UE. If the eNB can acquire information on the interference from neighboring eNBs as well as the signal from the serving eNB to the UE, it may perform signal transmission in a way of 1) protecting against influence from the neighboring eNB causing strong interference or 2) adjusting a resource allocation amount based on the serving eNB and the aggressor eNB. The more channel information the UE reports, the more throughput improvement the wireless communication system will achieve.

For this purpose, the 3GPP LTE-A Release 11 has adopted a data communication technology for a UE to communicate data with multiple eNBs in a cooperative and interference-control manner based on the channel status information measured in association with the multiple eNBs, so called CoMP. In LTE-A, three CoMP schemes have been discussed.

First, Joint Transmission (JT) is a technique for one or more eNBs as transmitters share the data destined for a UE in advance and transmit the data to the UE in a cooperative manner. The main gain of this scheme is a combining gain achieved by receiving data from one or more eNBs simultaneously. Second, Coordinated Scheduling/Coordinated Beamforming (CS/CB) is a technique of selecting an eNB for communication based on the channel status information between the UE and multiple eNBs to minimize interference from neighboring eNBs through interference control or beamforming without sharing data destined to the UE among the eNBs. The main gain of this scheme is an interference control gain capable of adjusting interference amount by controlling signal transmissions of the eNBs. Third, Dynamic Point Selection (DPS) is a technique in which an eNB having the best channel condition, among multiple eNBs sharing the data destined for a UE, transmits data to the UE, the best eNB being selected at a short interval. The main gain of this scheme is selection diversity capable of selecting the eNB guaranteeing the best reception performance of the UE among the eNBs.

In order to support the three CoMP schemes described above, it is necessary for channel status information feedback operations of the UE to be defined for respective CoMP schemes. For this purpose, the 3GPP LTE standard specifies channel status information feedback schemes as follows.

An eNB configures two types of radio resources for channel measurement, i.e., Channel State Information-Reference Signal (CSI-RS) and CSI-Interference Measurement (CSI-IM), in order for a UE to perform channel measurements for one or more eNBs including itself. First, the UE may detect signal components from a combination of up to 3 neighboring eNBs using a non-zero power CSI-RS on the CSI-RS resource. Second, the UE may detect interference components from a combination of up to 3 neighboring eNBs using zero power CSI-RS on the CSI-IM resource. For this purpose, the eNBs participating in the CoMP transmission transmit signals on the radio resources designated through CSI-RS and CSI-IM configurations as intended by the serving eNB.

The UE may measure a Signal-to-Interference-plus-Noise Ratio (SINR) through up to 4 CSI processes per component carrier combining a total of 6 measurement results and perform feedback of Channel Quality Information (CQI) generated in consideration of presence/absence of interference from the neighboring eNBs to the serving eNB.

The eNB can acquire channel quality information required for CoMP transmission operations such as JT, CS/CB, and DPS by configuring the CSI-RS and CSI-IM appropriately.

Figure 2:
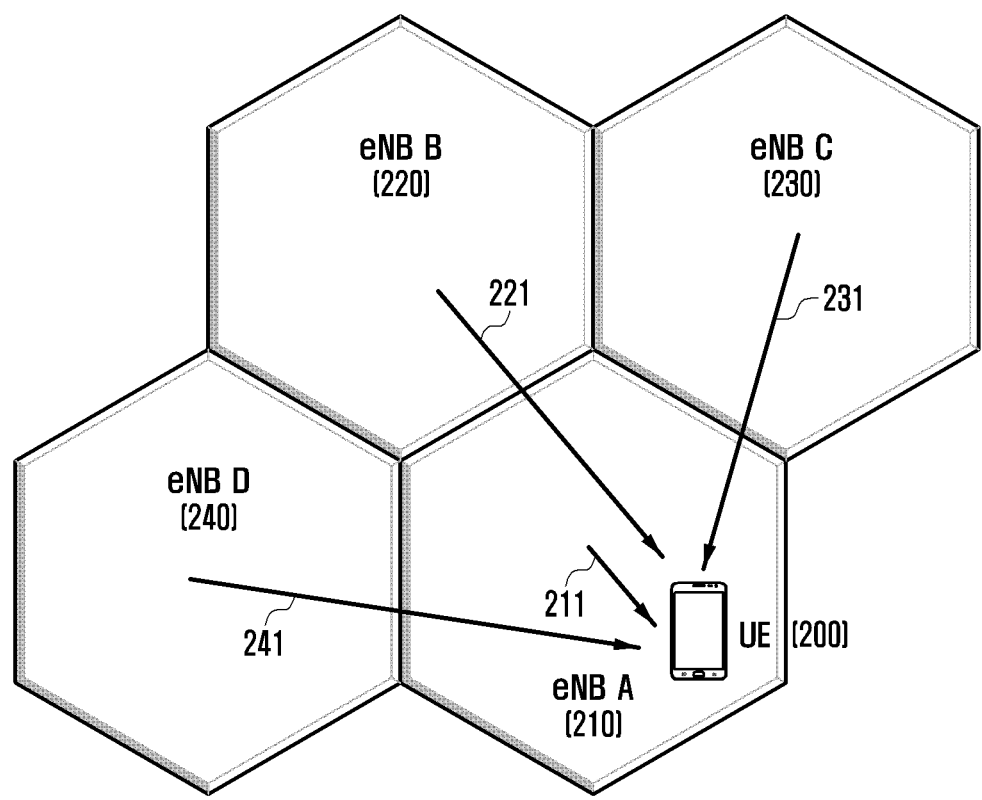
FIG. 2 is a diagram illustrating an exemplary communication situation between a UE and an eNB in a cellular communication system.

FIG. 2 is a diagram illustrating an exemplary communication situation between a UE and an eNB in a cellular communication system.

In reference to FIG. 2, assuming that there is a UE 200, an eNB A 210 serving the UE 200 as denoted by 211, and neighboring eNBs B, C, and D 220, 230, and 240, the signals 221, 231, and 241 transmitted by the neighboring eNBs B, C, and D are regarded as interference signals. The UE may detect up to three signal and interference components including the signal from the serving eNB A. For the CS/CB scheme, reference signals may be configured as shown in Table 1.

TABLE 1

| Signal component | | Interference component | |
| --- | --- | --- | --- |
| CSI-RS configuration index | eNB signal transmission on CSI-RS resource | CSI-IM configuration index | eNB signal transmission on CSI-IM resource |
| CSI-RS cfg. 0 | Transmission at eNB A | CSI-IM cfg. 0 | Mute at eNB A |
| CSI-RS cfg. 1 | Transmission at eNB B | CSI-IM cfg. 1 | Mute at eNB B |
| CSI-RS cfg. 2 | Transmission at eNBs A and B | CSI-IM cfg. 2 | Mute at eNBs A and B |

Each item indicates a CSI-RS configuration or a CSI-IM configuration.

By combining the signal and interference components, it is possible to configure a CSI process for the combination of eNBs A and B as follows.

TABLE 2

| CSI process | Combination of CSI processes | SINR combination |
| --- | --- | --- |
| CSI process 0 | CSI-RS cfg. 0/CSI-IM cfg. 0 | $\dfrac{A}{B+NI}$ |
| CSI process 1 | CSI-RS cfg. 0/CSI-IM cfg. 2 | $\dfrac{A}{NI}$ |
| CSI process 2 | CSI-RS cfg. 1/CSI-IM cfg. 1 | $\dfrac{B}{A+NI}$ |
| CSI process 3 | CSI-RS cfg. 1/CSI-IM cfg. 2 | $\dfrac{B}{NI}$ |

In Table 2, NI denotes the sum of interferences and noises from the eNBs C and D. If the UE transmits the combinations to the eNB, the eNB checks reception SINR information of the UE for four cases as follows.

Figure 3A:
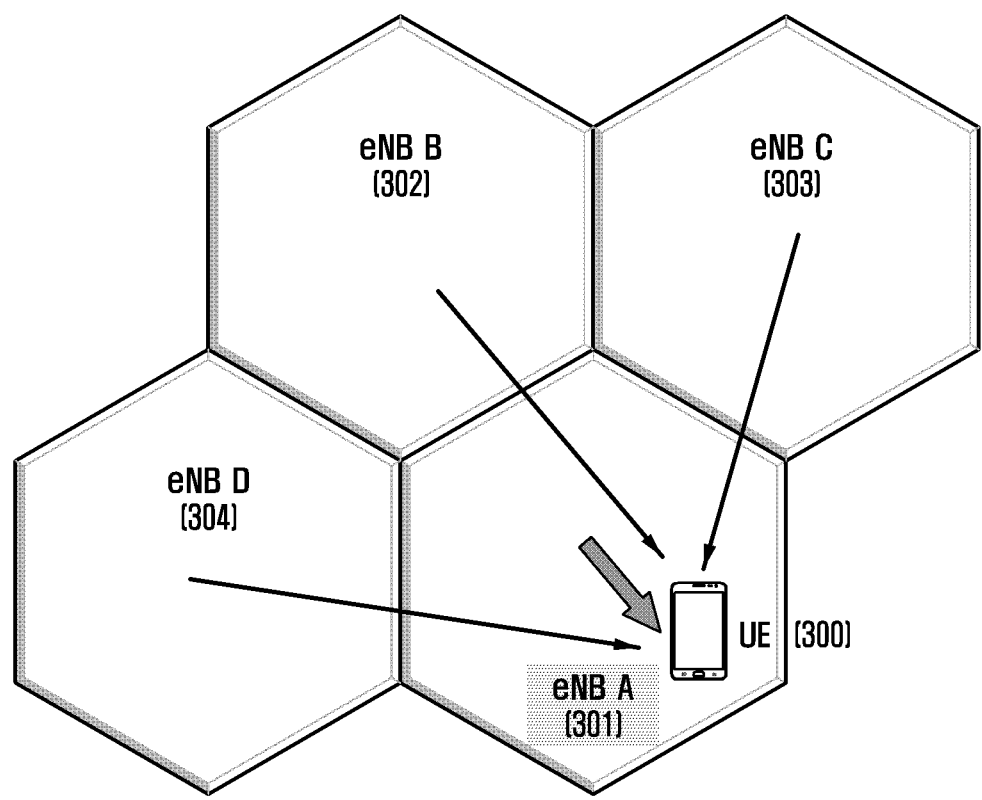
FIGS. 3A-3D are diagrams illustrating communication situations for respective CSI processes of Table 2.
Figure 3B:
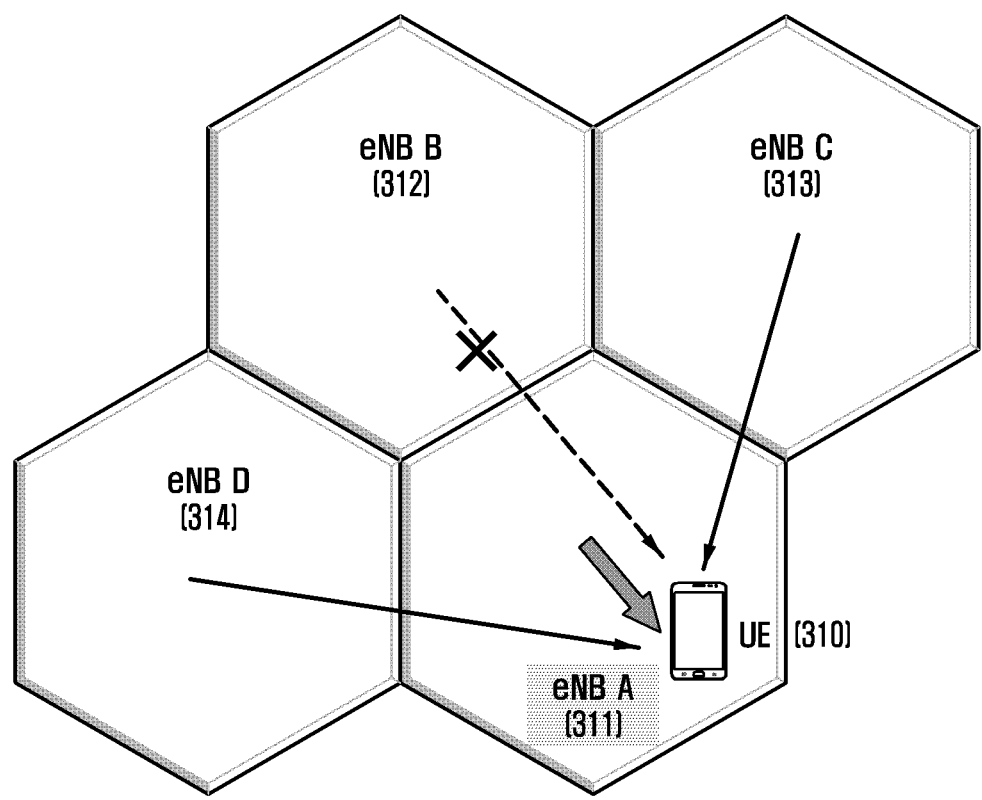
Figure 3C:
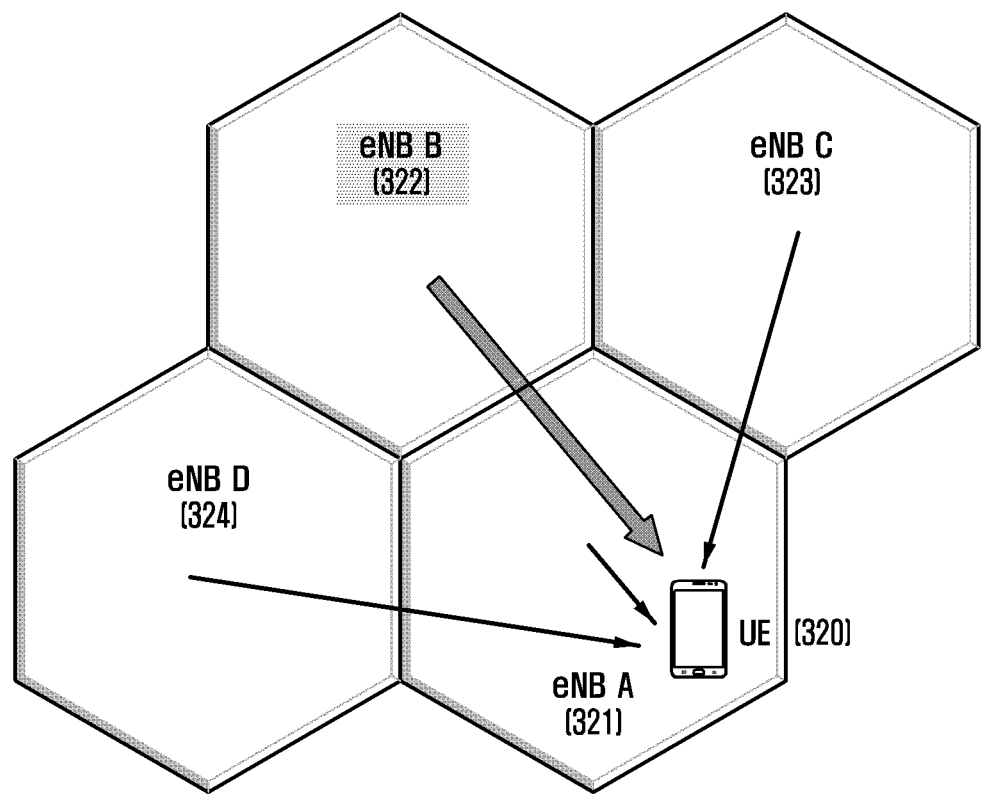
Figure 3D:
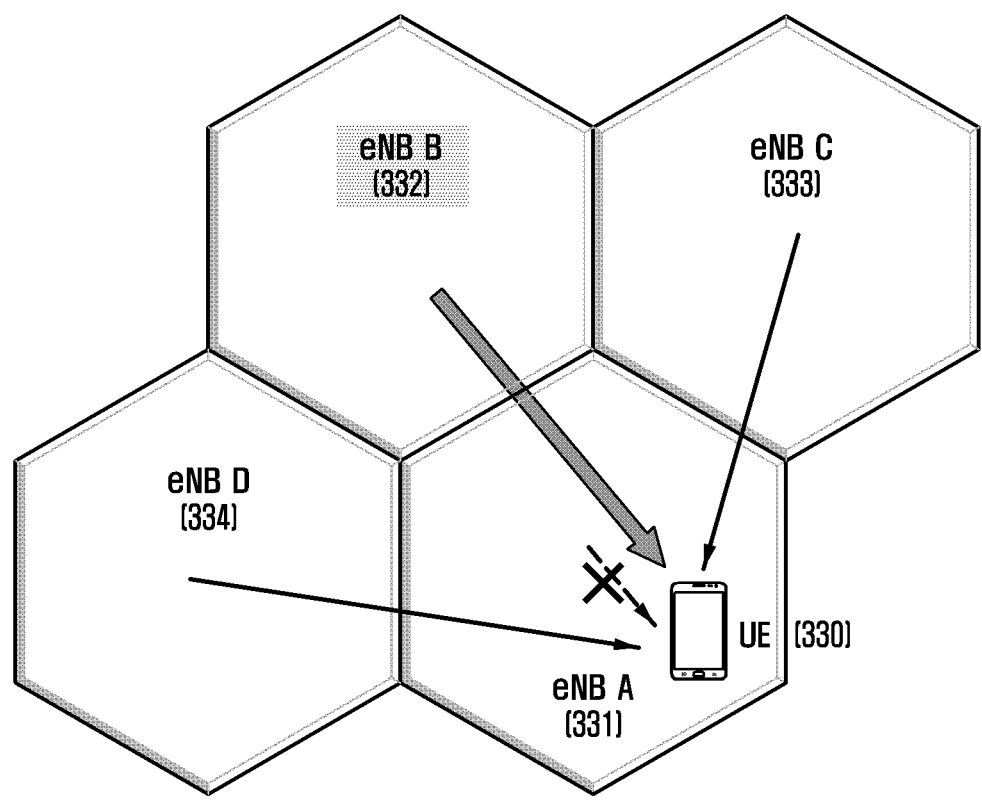

FIGS. 3A-3D are diagrams illustrating communication situations for the respective CSI processes of Table 2. In reference to Table 2, FIG. 3A shows CSI process 0, FIG. 3B shows CSI process 1, FIG. 3C shows CSI process 2, and FIG. 3D shows CSI process 3. FIG. 3A is directed to a CSI process of a UE 300 served by the eNB A 301 for processing the combination of the signal component CSI-RS cfg. 0 transmitted by the eNB A 301 and the sum of the signal from the eNB B 302 and interference and noise components CSI-IM cfg.0 from the eNB C 303 and eNB D 304. FIG. 3B is directed to a CSI process of the UE 310 served by the eNB A 311 for processing the combination of the signal component CSI-RS cfg. 0 from the eNB A 311 and the sum of interference and noise components CSI-IM cfg. 2 from the eNB C 313 and eNB D 314. FIG. 3C is directed to a CSI process of the UE 320 served by the eNB B 322 for processing the combination of the signal component CSI-RS cfg. 1 transmitted by the eNB B 322 and the sum of the signal component from the eNB A 321 and interference and noise components CSI-IM cfg. 1 from the eNBs C 323 and eNB D 324. FIG. 3D is directed to a CSI process of a UE 330 served by the eNB B 332 for processing the signal component CSI-RS cfg. 1 and the sum of the interference and noise components CSI-IM cfg. 2 from the eNB C 333 and eNB D 334. In the cases of CSI processes 2 and 3, the UE is actually served by the eNB A; but, assuming that the eNB B is serving the UE, the CSI processes are configured for measuring the SINR. The UE measures the SINR for four cases of FIGS. 3A-3D through the configured CSI processes and transmits the measurement result to the eNB in the form of CQI.

In the case of configuring a CSI process for JT or DPS rather than CS/CB, it may be possible to perform CSI process configuration as shown in Table 4 based on the CSI-RS and CSI-IM configurations of Table 3 for JT and as shown in Table 6 based on the CSI-RS and CSI-IM configurations of Table 5 for DPS.

TABLE 3

| Signal component | | Interference component | |
| --- | --- | --- | --- |
| CSI-RS configuration index | eNB signal transmission on CSI-RS resource | CSI-IM configuration index | eNB signal transmission on CSI-IM resource |
| CSI-RS cfg. 0 | Transmission at eNBs A and B | CSI-IM cfg. 0 | Transmission at eNBs C and D |
| CSI-RS cfg. 1 | Transmission at eNBs A and C | CSI-IM cfg. 1 | Transmission at eNBs B and D |
| CSI-RS cfg. 2 | Transmission at eNBs A and D | CSI-IM cfg. 2 | Transmission at eNBs B and C |

TABLE 4

| CSI process | Combination of CSI processes | SINR combination |
| --- | --- | --- |
| CSI process 0 (JT of A and B) | CSI-RS cfg. 0/ CSI-IM cfg. 0 | $\dfrac{A+B}{C+D+N}$ |
| CSI process 1 (JT of A and C) | CSI-RS cfg. 1/ CSI-IM cfg. 1 | $\dfrac{A+C}{B+D+N}$ |
| CSI process 2 (JT of A and D) | CSI-RS cfg. 2/ CSI-IM cfg. 2 | $\dfrac{A+D}{B+C+N}$ |
| CSI process 3 (reserved) | | |

TABLE 5

| Signal component | | Interference component | |
| --- | --- | --- | --- |
| CSI-RS configuration index | eNB signal transmission on CSI-RS resource | CSI-IM configuration index | eNB signal transmission on CSI-IM resource |
| CSI-RS cfg. 0 | Transmission at eNB A | CSI-IM cfg. 0 | Transmission at eNBs B, C, and D |
| CSI-RS cfg. 1 | Transmission at eNB B | CSI-IM cfg. 1 | Transmission at eNBs A, C, and D |
| CSI-RS cfg. 2 | Transmission at eNB C | CSI-IM cfg. 2 | Transmission at eNBs A, B, and D |

TABLE 6

| CSI process | Combination of CSI processes | SINR conversion |
| --- | --- | --- |
| CSI process 0 | CSI-RS cfg. 0/ CSI-IM cfg. 0 | $\dfrac{A}{B+C+D+N}$ |
| CSI process 1 | CSI-RS cfg. 1/ CSI-IM cfg. 1 | $\dfrac{B}{A+C+D+N}$ |
| CSI process 2 | CSI-RS cfg. 2/ CSI-IM cfg. 2 | $\dfrac{C}{A+B+D+N}$ |
| CSI process 3 (reserved) | | |

In the SINR formula, N denotes noise.

Using Tables 3 and 4, it is possible to configure a CSI process for JT, i.e., acquire SINR information for cooperative transmission of two or more eNBs, or for DPS, i.e., acquire per-eNB SINRs to select an eNB with the best channel status in the transmission point selection process.

The eNB selects a scenario maximizing the throughput of the UE and controls data transmission based on the channel quality information feedback from the UE. In the case where multiple UEs exists in the communication network, the eNB receives channel quality information through one or more CSI processes per UE and performs scheduling and eNB selection based on the channel quality information in a way of optimizing network throughput.

Configuring multiple CSI processes is advantageous in that the serving eNB can receive information on the influence of neighboring eNBs directly from the UE, but it has a drawback in that the number of CSI-RS and CSI-IM configurations is limited to 3 and the number of CSI processes to 4. A UE may be influenced by at least 7 closest eNBs including the serving eNB in a hexagonal cell model, and the number of eNBs influencing the UE is likely to increase in the real communication system in which the cells are sectored. In the case that there are a large number of eNBs influencing the UE, it may be impossible to perform measurement on the signals from all the eNBs completely with the CSI process configurations specified in the standard.

Although CSI-RS and CSI-IM resources are configured per set of specific eNBs, the channel quality information capable of being acquired, i.e., SINR combinations, is limited by the number of CSI-RS processes, i.e., 4, and it is impossible to achieve the goal of securing various SINR values associated with neighboring eNBs.

In the example of CS/CB, if a CSI process is configured to select two of four eNBs for simultaneous transmission or alternative transmission, the total number of configurable cases becomes 24 (4 combination 2×4). That is, it becomes possible to select a combination of eNBs that promise the best performance of the UE based on the 24 SINRs. This means that it is necessary to configure a CSI process, changing the combination of eNBs 6 times, to receive feedback from the UE sequentially because the number of combinations of SINRs that can be configured simultaneously is 4.

FIG. 4 is a flowchart illustrating a procedure for a UE to measure multiple SINRs for feedback. The eNB configures candidate eNBs for SINR measurement at step 400 and transmits to the UE a CSI-RS configuration, a CSI-IM configuration, and a CSI process combination through Radio Resource Control (RRC) signaling at step 410. The UE performs CQI measurement per CSI process according to the information from the eNB at step 420 and performs feedback of 4 CQIs to the eNB at step 430. This procedure is repeated by changing the candidate eNB combination at step 440.

As shown in FIG. 4, it is necessary for the UE to determine repeatedly channel quality based on the configuration information transmitted by the eNB through RRC signaling and to perform repeatedly CQI feedback in order for the eNB to acquire a total of 24 CQIs. The frequent RRC configuration information transmission from the eNB to the UE causes a downlink overhead problem, the frequent CQI transmission from the UE to the eNB causes an uplink overhead problem, and the frequent change of CQI elongates the CQI transmission interval for the same eNB combination, resulting in an increase of the probability of a mismatch between the channel status at the instant when the UE transmits data on the resources allocated by the eNB under the assumption of the best data transmission condition and the channel status indicated by the CQI feedback from the UE. Configuring 24 CSI processes for SINR measurement is the case of assuming the existence of only 4 eNBs around the UE; however, in the real network environment, there are likely to be more eNBs around the UE and thus the number of cases for correct measurement increases exponentially. This means that the aforementioned problems become worse.

The above problems are caused by applying the CQI-related downlink signaling specified in the standard, i.e., only the RRC signaling and channel quality information feedback, to a situation requiring a plurality of CSI process configurations and operations. There is therefore a need of a method for estimating channel quality efficiently without compromising the advantage in terms of measurement of interference from neighboring eNBs as a goal of the introduction of multiple CSI processes.

The present invention is directed to a method for determining the SINR for use in downlink data transmission in consideration of a CoMP transmission scheme using the channel quality information fed back through a plurality of CSI processes configured based on Reference Signal Received Power (RSRP) included in the measurement report of the UE, as a UE-eNB (in the present invention, an eNB can be interpreted as a Transmission Point (TP) or a Remote Radio Head (RRH)) channel information or uplink Sounding Reference Signal (SRS) information.

Figure 5:
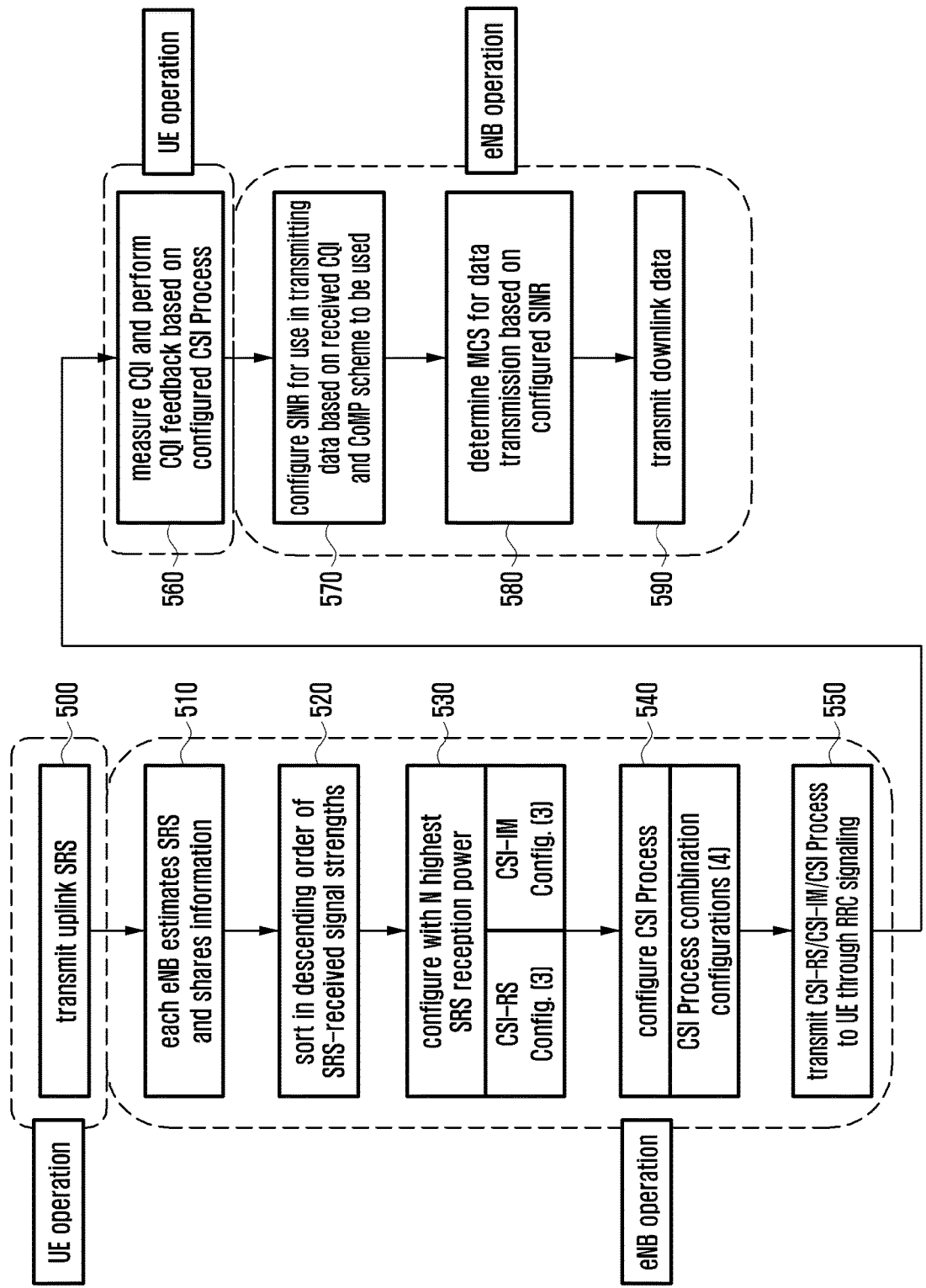
FIG. 5 is a flowchart illustrating the overall operation of the present invention.

FIG. 5 is a flowchart illustrating the overall operation of the present invention. The UE transmits an SRS in uplink at step 500 and, upon receipt of the SRS, the eNB measures a received signal power of the SRS and shares the SRS received signal power with other eNBs at step 510. The eNB prioritizes the SRSs in a descending order of reception power at step 520 and configures three CSI-RSs and three CSI-IMs to N eNBs with the highest SRS reception powers at step 530. The eNB configures 4 CSI processes by combining the CSI-RS configurations and CSI-IM configurations and, at step 550, transmits to the UE the information on the CSI-RS configurations, CSI-IM configurations, and combined CSI processes through RRC signaling. The UE measures the SINR based on the CSI processes to generate CQIs and perform CQI feedback at step 560; and the eNB calculates at step 570 an SINR for data transmission based on the received CQI and the CoMP transmission scheme to be used, determines a Modulation and Coding Scheme (MCS) for data transmission at step 580, and transmits downlink data to the UE using the MCS at step 590. A description is made of the invention in detail hereinafter.

In the following description, it is assumed that uplink SRS is used as UE-eNB channel information for configuring multiple CSI processes. The uplink SRS is a signal transmitted by the UE for use by the eNB in measuring uplink channel quality. Since the eNB has the information on the transmission power of the UE, it may be possible to estimate the channel quality between the UE and the eNB by estimating the signal attenuation amount while the SRS propagates the channel.

In a Time Division Duplex (TDD) mode, since the uplink for SRS transmission and the downlink for data transmission are reciprocal on the same frequency, it may be possible to use the uplink channel quality estimated based on the SRS as downlink channel quality. In a Frequency Division Duplex (FDD) mode, since the uplink and downlink are on different frequencies with different channel characteristics, it may be unreasonable to use the uplink channel quality estimated based on the SRS for downlink transmission directly, but it may be used indirectly for relative comparison of channel quality.

Figure 6:
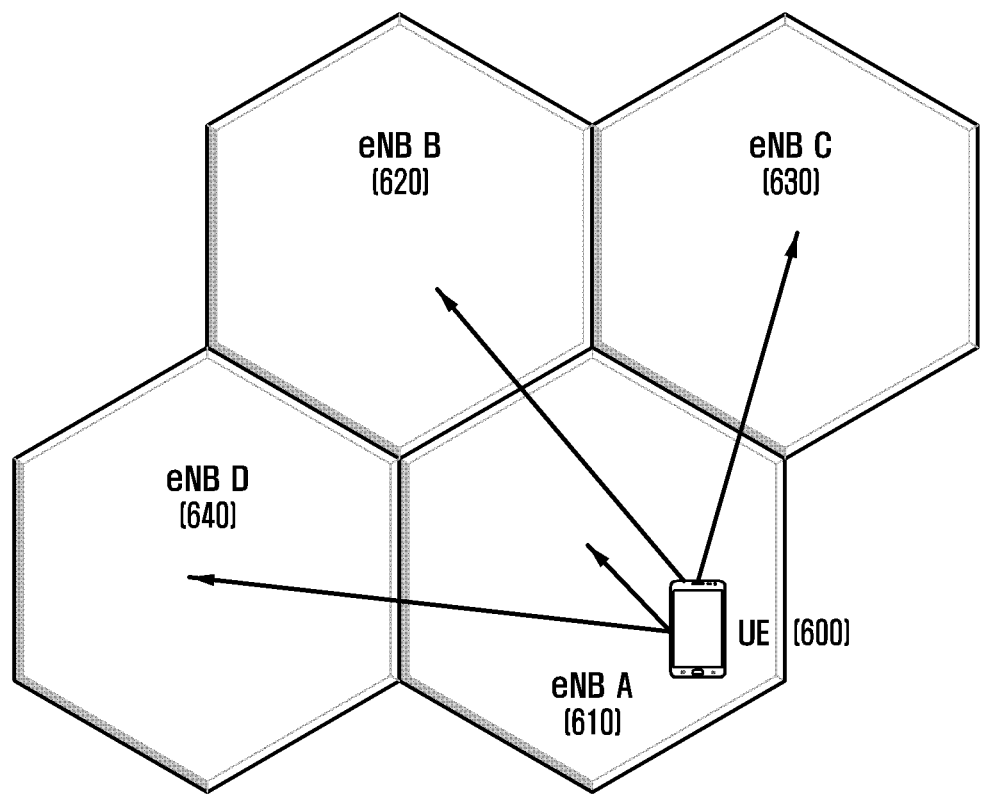
FIG. 6 is a diagram illustrating an SRS transmitted from a UE to eNBs.

FIG. 6 is a diagram illustrating an SRS transmitted from a UE to eNBs. The SRS transmitted by the UE 600 may be received by the neighboring eNBs (i.e., eNB B 620, eNB C 630, and eNB D 640) as well as the eNB A 610 serving the UE 600. Here, it is assumed that the eNBs share the Physical Cell Identifier (PCID) and the SRS resource allocation information of the serving eNB A so as to measure SRS reception power based thereon.

A certain processor sorts the eNBs in a descending order of the SRS-received signal powers. The processor may be located inside an eNB or be a separate device. If the eNBs are sorted in the descending order of eNB A>eNB B>eNB C>eNB D, each eNB may sort the interference aggressors in an order of interference strength, and this order may be used as a descending order of interference aggressors to the UE in downlink transmission directly in the TDD mode or indirectly in the FDD mode.

The present invention includes a method for configuring CSI-RS and CSI-IM configurations and multiple CSI processes based on the SRS-reception power order. This method includes 1) selecting N highest SRS reception powers, 2) configuring up to 3 CSI-RS configurations based on the N eNBs corresponding to the N highest SRS-reception powers, and 3) configuring up to 3 CSI-IM configurations based on the N eNBs corresponding to the N highest SRS-reception powers. In comparison with the operation without use of SRS, since only the N eNBs with high SRS-reception powers are regarded as CSI process configuration targets, it is possible to increase the probability of selecting neighboring eNBs that are likely to actually cause interference to the UE and, although there are many eNBs around the UE, the number of eNBs to be selected is limited to N, thereby protecting against an increase of CQI acquisition complexity. Since there is no need, unless the location of the UE is changed abruptly, for the UE to continue correcting the CSI-RS, CSI-IM, and CSI process configuration information and transmitting them through RRC signaling and the eNB receives the uplink SRS periodically, this method is advantageous in terms of causing no extra overhead. Here, H is a system parameter that can be optionally configured and shared among eNBs.

The eNB transmits to the UE the information on the CSI-RS, CSI-IM, and CSI-RS process configurations configured as described above.

A description is made hereinafter of the method for generating SINR values for use in downlink data transmission according to a CoMP transmission scheme based on the CQI feedback from a UE.

The eNB selects three eNBs with the highest SRS-reception powers. It is assumed that the eNB can receive CQIs from the UE according to three CSI processes. If the eNBs are sorted in the descending order of eNB A>eNB B>eNB C>eNB D according to the SRS-reception power and if the UE is served by the eNB A, the eNB selects the eNB A serving the UE, the eNB B, and the eNB C. In this case, CSI-RS and CSI-IM configurations are configured as shown in Table 5.

TABLE 7

|  | CSI-RS/CSI-IM configuration index | eNB signal transmission on configured CSI-RS resource |
|---|---|---|
| CSI-RS configuration | CSI-RS cfg. 0 | Transmission at eNB A |
|  | CSI-RS cfg. 1 | Transmission at eNB B |
|  | CSI-RS cfg. 2 | Transmission at eNB C |
| CSI-IM configuration | CSI-IM cfg. 0 | Transmission at all eNBs |

In the case, the CSI process is configured as shown in Table 8 based on Table 7.

TABLE 8

| CSI process | CSI process configuration | SINR conversion |
|---|---|---|
| CSI process 0 | CSI-RS cfg. 0/ CSI-IM cfg. 0 | $\frac{A}{(A+B+C+NI)/\alpha} = X$ |
| CSI process 1 | CSI-RS cfg. 1/ CSI-IM cfg. 0 | $\frac{B}{(A+B+C+NI)/\alpha} = Y$ |
| CSI process 2 | CSI-RS cfg. 2/ CSI-IM cfg. 0 | $\frac{C}{(A+B+C+NI)/\alpha} = Z$ |

In the SINR conversion formulas in Table 8, α is an essential factor that causes a side effect of always making the actually measured SINR become less than 1 because all signals are transmitted simultaneously according to the CSI-IM configuration. This means that the CQI derived from the measured SINR always has a small value, resulting in reduction of distinctiveness. Accordingly, when all the eNBs transmit reference signals at the Resource Elements (REs) to which CSI-IM is mapped according to the CSI-IM configuration, power reduction (deboosting) is performed by as much as the amount indicated by α. The system parameter α is optionally configured and shared among eNBs In particular, the system parameter α may be applied in an interference-limited environment. In an interference-limited environment characterized by an interference component dominating noise (I>>N), it may be possible to make a configuration as above because the noise is negligible, although the power of a noise component, unlike the interference component, cannot be reduced as much as the amount indicated by α.

The UE measures SINR based on the CSI processes 0, 1, and 2 configured according to Tables 7 and 8 and transmits the measurement result to the eNB in the form of a CQI feedback. The eNB may acquire the relative SINR values X, Y, and Z of the eNBs A, B, and C based on the CQI feedback from the UE and, if the SINR of the eNB A is acquired based on the SINRs of the three eNBs with the highest SRS-reception powers, apply B'=A*Y/X for eNB B and C'=B*Z/X for eNB C.

The signal strengths of the eNBs A, B, and C may be calculated as follows with reference to Table 8.

$$\frac{A}{(A+B+C+NI)/\alpha} = X, A = \frac{NI}{(\alpha-Y-Z)/X-1} \qquad \text{Equation 1}$$

$$\frac{B}{(A+B+C+NI)/\alpha} = Y, B = \frac{NI}{(\alpha-Z-X)/Y-1} \qquad \text{Equation 2}$$

$$\frac{C}{(A+B+C+NI)/\alpha} = Z, C = \frac{NI}{(\alpha-X-Y)/Z-1} \qquad \text{Equation 3}$$

The eNB calculates the signal strengths of the eNBs A, B, and C from X, Y, and Z as SINR values based on the CQI feedback and substitutes them for the SRS-reception powers at the eNBs A, B, and C. This gives gains as follows. That is, in a carrier aggregation situation where the primary cell (PCell) operates in both the uplink and downlink, it is possible to calculate downlink SINR values for CoMP transmission based on the SRS without any CSI process configuration. This is advantageous in terms of generating all available SINR combinations for CoMP transmission of the eNBs having uplink SRS values; but, in FDD, it is necessary to reduce performance degradation caused by channel condition mismatch between downlink and uplink by reducing errors caused by the SRS values. Using the above-described CSI process configuration, it is possible to acquire accurate downlink signal qualities for three eNBs with the highest SRS-reception powers so as to calculate the accurate SINR for CoMP transmission under the assumption of service from the three eNBs with the highest SRS-reception powers and measure the strengths of interference signals from the three eNBs with the highest SRS-reception powers under the assumption of service from other eNBs, resulting in improvement of total SINR estimation performance.

In a case where only the downlink exists, i.e., in a secondary cell (SCell) supporting no SRS transmission/reception in a carrier aggregation (CA) situation, it is impossible to use the same method as the PCell because no SINR combination for CoMP transmission can be generated based on SRS. In this case, the eNB and the UE may configure the SINR per CoMP transmission scheme as follows using the CSI process configurations to the three eNBs with the highest SRS-reception powers acquired through the PCell.

$$\frac{A}{NI} = \frac{1}{(\alpha - Y - Z)/X - 1},$$
$$\frac{B}{NI} = \frac{1}{(\alpha - Z - X)/Y - 1},$$
$$\frac{C}{NI} = \frac{1}{(\alpha - X - Y)/Z - 1}$$
Equation 4

$$\frac{A}{B + C + NI} = \frac{A/NI}{B/NI + C/NI + 1} (\text{non } CoMP)$$
Equation 5

$$\frac{A}{B + C + NI} = \frac{A/NI}{B/NI + 1} (CS/CB)$$
Equation 6

$$\frac{A}{B + C + NI} = \frac{A/NI}{B/NI + C/NI + 1},$$
$$\frac{B}{A + C + NI} = \frac{B/NI}{A/NI + C/NI + 1} (DPS)$$
Equation 7

$$J\frac{A + C}{B + NI} = \frac{A/NI + C/NI}{B/NI + 1} (JT)$$
Equation 8

Equation (4) expresses relative signal strengths of the eNBs A, B, and C, and equations (5), (6), (7), and (8) are derived from equation (4). Equation (5) expresses a case where the eNB A is the serving eNB and the signals from the eNBs B and C are regarded as interference components in a situation applying no CoMP transmission scheme. Equation (6) expresses a case where the eNB A transmits signals while the eNB C is not working in a situation applying the CS/CB transmission scheme. Equation (7) expresses a case where the eNBs A and B transmit signals alternately. Equation (8) expresses a case where the eNBs A and C transmit signals simultaneously in a situation applying the JT transmission scheme.

The operation difference between the SCell without SRS-reception power and the PCell with SRS-reception power is that the SCell can configure a CoMP transmission scheme only for the three eNBs with the highest SRS-reception powers in association with the PCell. As described above, the PCell is capable of configuring a CoMP transmission scheme for more than 3 eNBs by substituting the downlink signal strengths calculated based on the CQI feedback for the SRS-reception power for the 3 eNBs with the highest SRS-reception powers and applying the SRS-reception powers for the eNBs with the non-highest SRS-reception powers.

Figure 7:
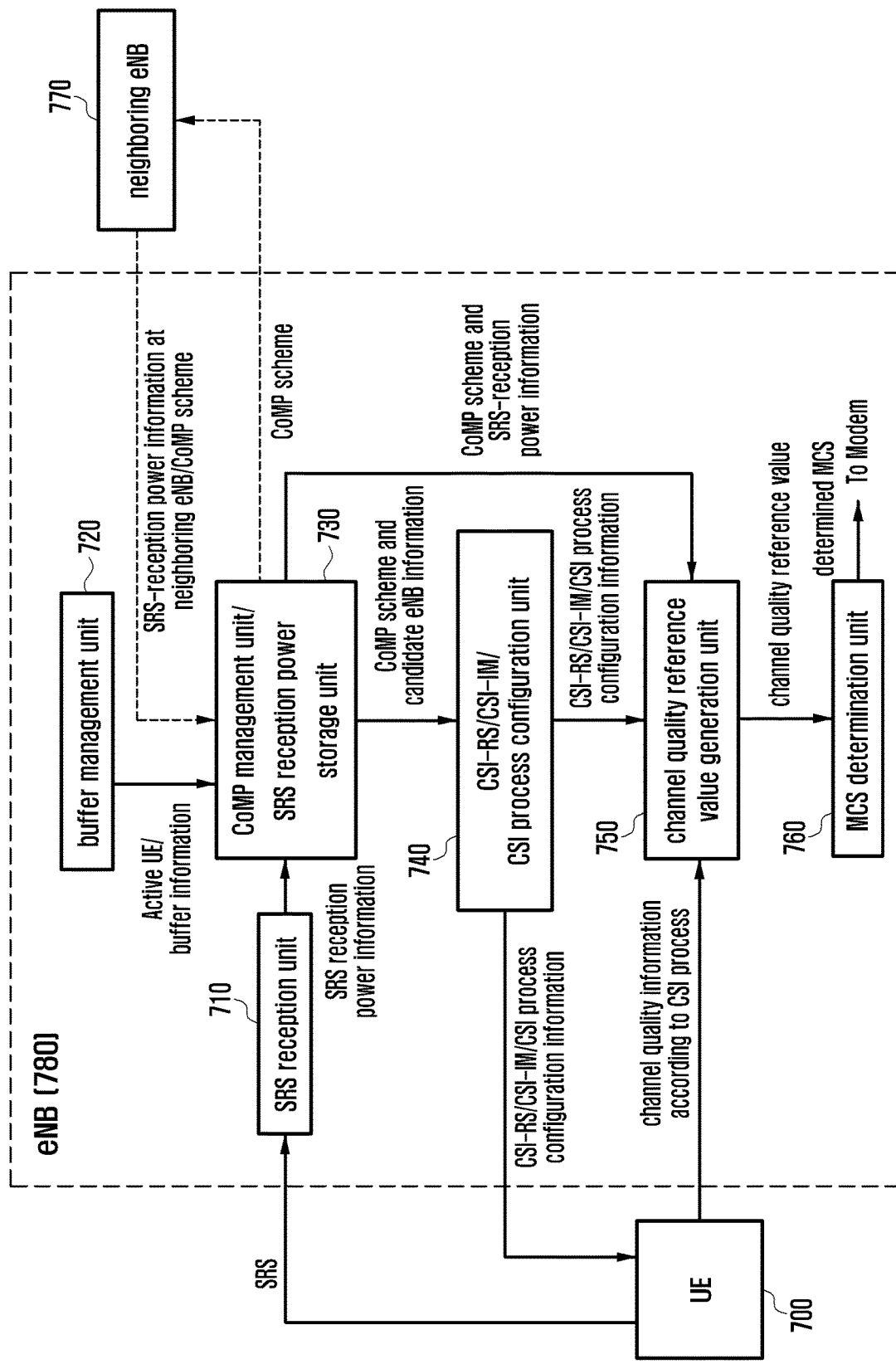
FIG. 7 is a block diagram illustrating an eNB controlling the CoMP transmission operation.
Figure 8:
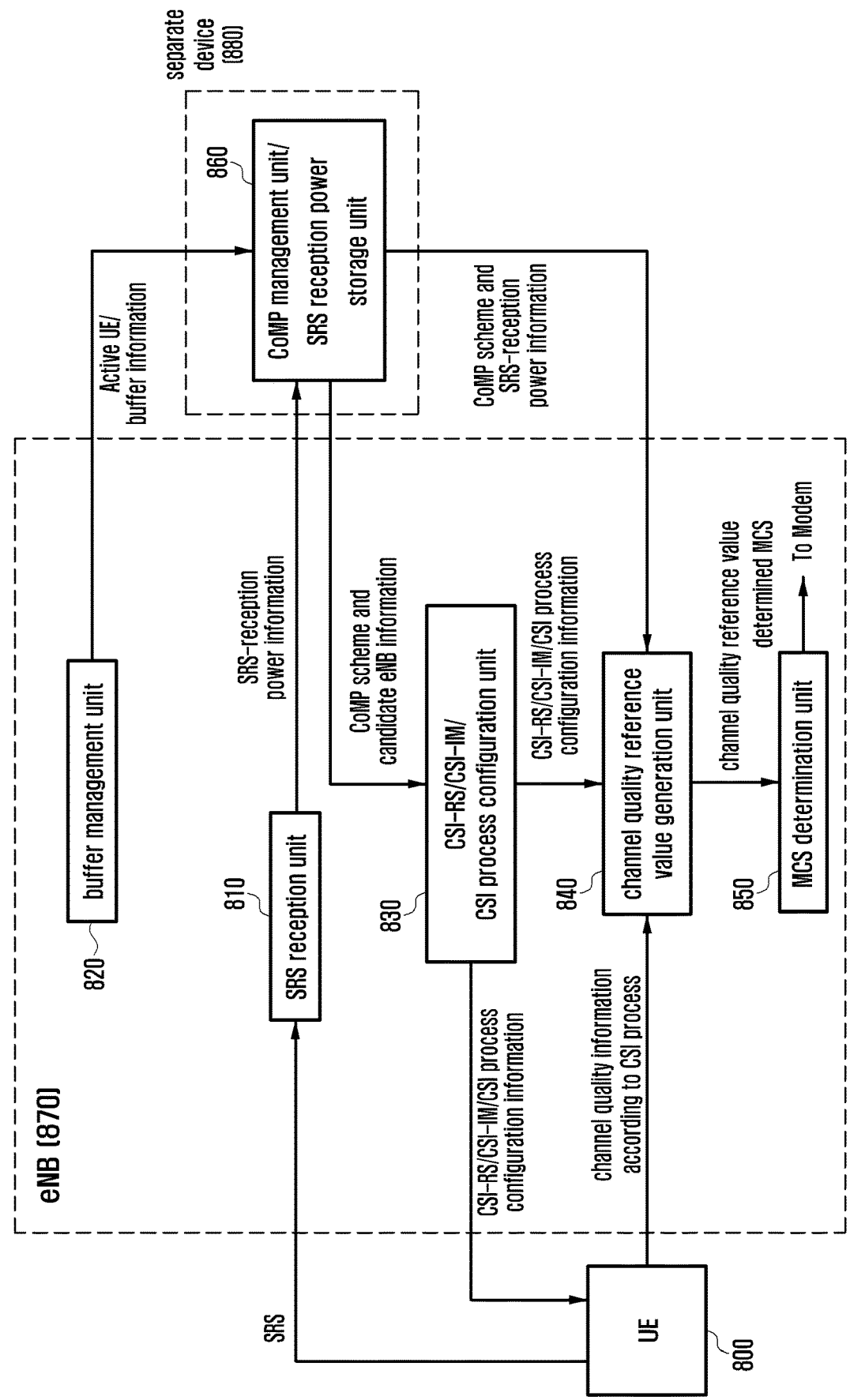
FIG. 8 is a block diagram illustrating an eNB and a CoMP management unit that is implemented as a separate device for controlling the CoMP transmission operation.

The operation of the present invention may be performed by the two devices of FIGS. 7 and 8. FIG. 7 is a block diagram illustrating an eNB controlling the CoMP transmission operation, and FIG. 8 is a block diagram illustrating an eNB and a CoMP management unit that is implemented as a separate device for controlling the CoMP transmission operation.

In reference to FIG. 7, an SRS reception unit 710 receives an SRS transmitted by a UE 700, and a CoMP management unit/SRS reception power storage unit 730 performs all calculations related to CoMP transmission operations including determining a CoMP transmission scheme to be performed with neighboring eNBs based on the SRS-reception power information received from the neighboring eNB 770, SRS-reception power information received from the SRS reception unit 710, and data received from a buffer management unit 720 and transmits information on the candidate CoMP eNBs for performing the CoMP transmission to a CSI-RS/CSI-IM/CSI process configuration unit 740. Here, the CoMP transmission operation is determined through negotiation and information exchange with the neighboring eNBs. The neighboring eNB may be a logical entity existing in the same hardware or a physically-separated eNB. The CSI-RS/CSI-IM/CSI process configuration unit 740 configures CSI-RS/CSI-IM/CSI processes based on the information of the eNBs participating the CoMP transmission that is provided by the CoMP management unit according to an embodiment of the present invention and transmits the configuration information to the UE and a channel quality reference value generation unit 750. The channel quality reference value generation unit generates SINR information for downlink data transmission in a CoMP transmission scheme, receives channel quality information from the UE through CSI processes, and transmits a channel quality reference value to an MCS determination unit 760. The MCS determination unit determines an MCS and notifies a modem of the MCS. The buffer management unit 720 determines presence/absence of user data, manages UEs having data to transmit thereto and buffer size, and transmits buffer information to the CoMP management unit/SRS reception power storage unit. The buffer management unit, the SRS reception unit, the CoMP management unit/SRS reception power storage unit, the CSI-RS/CSI-IM/CSI process configuration unit, the channel quality reference value generation unit, and the MCS determination unit may be located inside the eNB 780, transmit/receive signals to/from the UE and the neighboring eNB by means of a transceiver, and be configured in such a way that the management unit includes the buffer management unit, the CoMP management unit, the CSI-RS/CSI-IM/CSI process configuration unit, the channel quality reference value generation unit, and the MCS configuration unit.

In reference to FIG. 8, the eNB 870 may include a buffer management unit 820, an SRS reception unit 810, a CSI-RS/CSI-IM/CSI process configuration unit 830, a channel quality reference value generation unit 840, and an MCS determination unit 850; a CoMP management unit/SRS reception power storage unit 860 may be implemented as a separate device 880 outside the eNB, and the CoMP management unit may receive CoMP operation-related information transmitted by individual eNBs, manage and notify the CoMP scheme to be used by the eNB, candidate eNB information, and SRS reception power based on the CoMP operation-related information in a centralized manner. A separate device for managing eNBs and CoMP schemes may include a transceiver and a management unit, and the transceiver may communicate signals with the UE and neighboring eNBs, the management unit may include the buffer management unit, the CSI-RS/CSI-IM/CSI process configuration unit, the channel quality reference value generation unit, and the MCS determination unit, and the management unit of the separate device may include the CoMP management unit/SRS reception power storage unit.

It is to be appreciated that those skilled in the art can change or modify the embodiments without departing from the technical concept of this invention. Accordingly, it should be understood that the above-described embodiments are essentially for illustrative purposes only and are not in any way for restriction thereto. Thus, the scope of the invention should be determined by the appended claims and their legal equivalents rather than the specification, and various alterations and modifications within the definition and scope of the claims are included in the claims.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method by a terminal in a wireless communication system, the method comprising:
    transmitting an uplink sounding reference signal to a plurality of base stations, including a serving transmission point and neighboring transmission points, wherein the serving transmission point serves the terminal and the neighboring transmission points are neighbors to the serving transmission point;
    receiving channel status information (CSI) configuration information including CSI process configurations configured for measuring downlink transmission powers of N transmission points from among the serving transmission point and the neighboring transmission points, wherein the N transmission points are selected as the N transmission points having highest reception powers of the sounding reference signal among the serving transmission point and the neighboring transmission points, based on a result of ordering the reception powers of the sounding reference signal received by each of the serving transmission point and the neighboring transmission points from highest to lowest reception power based on a comparison of the reception powers of the sounding reference signal;
    measuring a signal-to-interference-plus-noise ratio based on the CSI configuration information;
    generating channel quality information (CQI) based on the signal-to-interference-plus-noise ratio; and
    transmitting the CQI to the serving transmission point.

2. The method of claim 1, wherein the CSI configuration information further includes CSI interference measurement configurations, and
    wherein the CSI interference measurement configurations comprise one CSI interference measurement configuration which is configured for measuring transmission powers of all of the serving and neighboring transmission points.

3. The method of claim 1, wherein the CSI process configurations comprise N CSI process configurations as combinations of CSI reference signal configurations and CSI interference measurement configurations.

4. The method of claim 1, further comprising receiving data transmitted using a Modulation and Coding Scheme (MCS) determined based on the CQI.

5. A method by a base station including a serving transmission point and neighboring transmission points in a wireless communication system, the method comprising:
    receiving an uplink sounding reference signal from a terminal;
    identifying a reception power of the sounding reference signal received at each of the serving transmission point and the neighboring transmission points, wherein the serving transmission point serves the terminal and the neighboring transmission points are neighbors to the serving transmission point;
    selecting N transmission points having highest reception powers of the sounding reference signal from among the serving transmission point and the neighboring transmission points, based on ordering the reception powers of the sounding reference signal received by each of the serving transmission point and neighboring transmission points from highest to lowest reception power based on a comparison of the reception powers of the sounding reference signal;
    generating channel status information (CSI) configuration information including CSI process configurations configured for measuring downlink transmission powers of the selected N transmission points;
    transmitting the CSI configuration information to the terminal; and
    receiving channel quality information (CQI) from the terminal, the CQI being generated by the terminal based on a signal-to-interference-plus-noise ratio measured by the terminal based on the CSI configuration information.

6. The method of claim 5, wherein the CSI configuration information further includes CSI interference measurement configurations, and
    wherein the CSI interference measurement configurations comprise one CSI interference measurement configuration which is configured for measuring transmission signal powers of all of the serving transmission point and the neighboring transmission points.

7. The method of claim 5, wherein the CSI process configurations comprise N CSI process configurations as combinations of CSI reference signal configurations and CSI interference measurement configurations.

8. The method of claim 5, further comprising transmitting data using a Modulation and Coding Scheme (MCS) determined based on the CQI.

9. A terminal in a wireless communication system, the terminal comprising:
    a transceiver; and
    a controller configured to control the transceiver to:
        transmit an uplink sounding reference signal to a plurality of base stations that includes a serving transmission point and neighboring transmission points, wherein the serving transmission point serves the terminal and the neighboring transmission points are neighbors to the serving transmission point,
        receive channel status information (CSI) configuration information including CSI process configurations configured for measuring downlink transmission powers of N transmission points from among the serving transmission point and the neighboring transmission points, wherein the N transmission points are selected as the N transmission points having highest reception powers of the sounding reference signal among the serving transmission point and the neighboring transmission points, based on a result of ordering the reception powers of the sounding reference signal received by each of the serving transmission point and the neighboring transmission points from highest to lowest reception power based on a comparison of the reception powers of the sounding reference signal, measure a signal-to-interference-plus-noise ratio based on the CSI configuration information;

generate channel quality information (CQI) based on the signal-to-interference-plus-noise ratio; and transmit the CQI to the serving transmission point.

10. The terminal of claim 9, wherein the CSI configuration information further includes CSI interference measurement configurations, and wherein the CSI interference measurement configurations comprise one CSI interference measurement configuration which is configured for measuring transmission signal powers of all of the serving transmission point and the neighboring transmission points.

11. The terminal of claim 9, wherein the CSI process configurations comprise N CSI process configurations as combinations of CSI reference signal configurations and CSI interference measurement configurations.

12. The terminal of claim 9, wherein the controller controls the transceiver to receive data transmitted using a Modulation and Coding Scheme (MCS) determined based on the CQI.

13. A base station of a plurality of base stations including a serving transmission point and neighboring transmission points in a wireless communication system, the base station comprising:

a transceiver; and a controller configured to:

control the transceiver to receive an uplink sounding reference signal from a terminal, identify a reception power of the sounding reference signal received at each of the serving transmission point and the neighboring transmission points, wherein the serving transmission point serves the terminal and the neighboring transmission points are neighbors to the serving transmission point, select N transmission points having highest reception powers of the sounding reference signal from among the serving transmission point and the neighboring transmission points, based on ordering the reception powers of the sounding reference signal received by each of the serving transmission point and neighboring transmission points from highest to lowest reception power based on a comparison of the reception powers of the sounding reference signal, generate channel status information (CSI) configuration information including CSI process configurations configured for measuring downlink transmission powers of the selected N transmission points, control the transceiver to transmit CSI configuration information to the terminal, and control the transceiver to receive channel quality information (CQI) from the terminal, the CQI being generated by the terminal based on a signal-to-interference-plus-noise ratio measured by the terminal based on the CSI configuration information.

14. The base station of claim 13, wherein the CSI configuration information further includes CSI interference measurement configurations, and wherein the controller configures one CSI interference measurement configuration which is configured for measuring transmission signal powers of all of the serving transmission point and the neighboring transmission points.

15. The base station of claim 13, wherein the controller configures N CSI process configurations as combinations of CSI reference signal configurations and CSI interference measurement configurations.

16. The base station of claim 13, wherein the controller controls the transceiver to transmit data using a Modulation and Coding Scheme (MCS) determined based on the CQI.

* * * * *